US012084116B2

(12) United States Patent
Booth et al.

(10) Patent No.: US 12,084,116 B2
(45) Date of Patent: Sep. 10, 2024

(54) ROOF ASSEMBLY FOR A WORK VEHICLE

(71) Applicant: CNH Industrial America LLC, New Holland, PA (US)

(72) Inventors: David Sheldon Booth, Fargo, ND (US); William Venth, Chicago, IL (US); Michael J. Braun, Oswego, IL (US); Thomas Michael Curley, Detroit Lakes, MN (US); Aaron Francis Onken, Kindred, ND (US); David Larry Tveito, West Fargo, ND (US); Russell V. Stoltman, Frankfort, IL (US); Abhishek Shende, Vadodara (IN)

( * ) Notice: Subject to any disclaimer, the term of this patent is extended or adjusted under 35 U.S.C. 154(b) by 336 days.

(21) Appl. No.: 17/718,971

(22) Filed: Apr. 12, 2022

(65) Prior Publication Data

US 2023/0202575 A1    Jun. 29, 2023

(30) Foreign Application Priority Data

Dec. 23, 2021    (IN) .............................. 202111060183

(51) Int. Cl.
*B62D 25/07*    (2006.01)
*B62D 33/06*    (2006.01)

(52) U.S. Cl.
CPC ......... *B62D 25/07* (2013.01); *B62D 33/0617* (2013.01); *B60Y 2200/221* (2013.01); *B60Y 2410/10* (2013.01)

(58) Field of Classification Search
CPC .... B62D 25/06; B62D 25/07; B62D 33/0617; B60Y 2200/221

(Continued)

(56) References Cited

U.S. PATENT DOCUMENTS 2,991,120 A * 7/1961 Barenyi .................... B60R 9/04
                                                    296/213
3,550,950 A    12/1970 Pollock
(Continued)

FOREIGN PATENT DOCUMENTS

DE        8914036        1/1990
JP        H0966860       3/1997
(Continued)

OTHER PUBLICATIONS

Tractor Service Brochure, Case IH Agriculture, 2013, p. 20, total pp. 3.

(Continued)

*Primary Examiner* — Dennis H Pedder
(74) *Attorney, Agent, or Firm* — Rickard K. DeMille; Rebecca L. Henkel; Peter K. Zacharias

(57) ABSTRACT

A roof assembly for a work vehicle includes a roof panel having a vertical peak positioned longitudinally between a forward end and a rearward end of the roof panel. In addition, the roof panel includes a forward surface extending from the vertical peak to the forward end of the roof panel, and the roof panel includes a rearward surface extending from the vertical peak to the rearward end of the roof panel. The roof panel also includes a ridge extending around a periphery of the roof panel. The ridge has a first gap positioned at the rearward end of the roof panel, a second gap positioned at the forward end of the roof panel, and a third gap positioned at a first lateral end of the roof panel. In addition, the roof panel does not include a channel extending along the roof panel.

20 Claims, 6 Drawing Sheets

(58) Field of Classification Search
USPC .................. 296/210, 190.07, 8, 213
See application file for complete search history.

(56) References Cited

U.S. PATENT DOCUMENTS

| | | | |
|---|---|---|---|
| 3,967,850 | A | 7/1976 | Whisler |
| 4,508,382 | A | 4/1985 | Tsumoto et al. |
| 4,650,242 | A | 3/1987 | Obe et al. |
| 5,074,611 | A * | 12/1991 | Newkirk ............... E05C 17/36 16/382 |
| 5,690,549 | A | 11/1997 | Webb et al. |
| 6,756,944 | B2 * | 6/2004 | Tessier ................... H01Q 7/00 343/713 |
| 7,198,323 | B2 | 4/2007 | Schoenauer et al. |
| 8,485,589 | B2 | 7/2013 | Obe et al. |
| D720,781 | S | 1/2015 | Venth et al. |
| 8,925,960 | B2 | 1/2015 | Uchida |
| 9,033,402 | B2 | 5/2015 | Salvini |
| 9,045,028 | B2 | 6/2015 | Ichikawa |
| 10,315,489 | B2 | 6/2019 | Shimada |
| 10,538,272 | B2 | 1/2020 | Nada et al. |
| 2004/0212221 | A1 | 10/2004 | Sato |
| 2006/0070310 | A1 | 4/2006 | Oliver |
| 2017/0101134 | A1 | 4/2017 | Miyazaki |
| 2019/0248421 | A1 | 8/2019 | Jacobsthal et al. |

FOREIGN PATENT DOCUMENTS

| | | |
|---|---|---|
| JP | 2007145143 | 6/2007 |
| JP | 2017114328 | 6/2017 |
| JP | 2018184100 | 11/2018 |
| KR | 200437979 | 1/2008 |
| KR | 200462348 | 9/2012 |
| KR | 20160034026 | 3/2016 |

OTHER PUBLICATIONS

John Deere, 7R 210 Tractor, https://www.deere.com/en/tractors/row-crop-tractors/row-crop-7-family/7r-210-tractor/; retrieved Oct. 19, 2021, 6 pgs.

U.S. Appl. No. 17/718,751, filed Apr. 12, 2022, David Sheldon Booth.

U.S. Appl. No. 29/820,718, filed Dec. 23, 2021, David Sheldon Booth.

U.S. Appl. No. 29/820,711, filed Dec. 23, 2021, David Sheldon Booth.

Eger Products, Inc., Tractor Canopies, http://www.egerproducts.com/Images/documents/Eger%20Tractor%20Canopy.pdf, retrieved Aug. 11, 2021, 11 pages.

Polymaster, Tractor Roofs, https://www.polymaster.com.au/agriculture/farm-storage-equipment/tractor-roofs/, retrieved Aug. 11, 2021, 5 pages.

* cited by examiner

ROOF ASSEMBLY FOR A WORK VEHICLE

BACKGROUND OF THE INVENTION

The present disclosure relates generally to a roof assembly for a work vehicle.

Certain work vehicles, such as tractors, harvesters, and sprayers, have a cab configured to house an operator during operation of the work vehicle. The cab generally includes a roof configured to shield the operator from the sun and rain. Certain roofs have channels configured to direct rain water to locations along the periphery of the roof. The locations may be positioned to direct the falling water away from a primary field of view of the operator. Unfortunately, a roof having channels may enable water to collect (e.g., pool) on the roof. Accordingly, when an operator enters the cab for subsequent operation of the work vehicle, rotation of the cab toward the operator (e.g., due to the weight of the operator acting on the suspension of the cab/work vehicle) may cause the collected water to fall on the operator.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a roof assembly for a work vehicle includes a roof panel having a vertical peak positioned longitudinally between a forward end and a rearward end of the roof panel. In addition, the roof panel includes a forward surface extending from the vertical peak to the forward end of the roof panel, and the roof panel includes a rearward surface extending from the vertical peak to the rearward end of the roof panel. The roof panel also includes a ridge extending around a periphery of the roof panel. The ridge has a first gap positioned at the rearward end of the roof panel, a second gap positioned at the forward end of the roof panel, and a third gap positioned at a first lateral end of the roof panel. In addition, the roof panel does not include a channel extending along the roof panel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
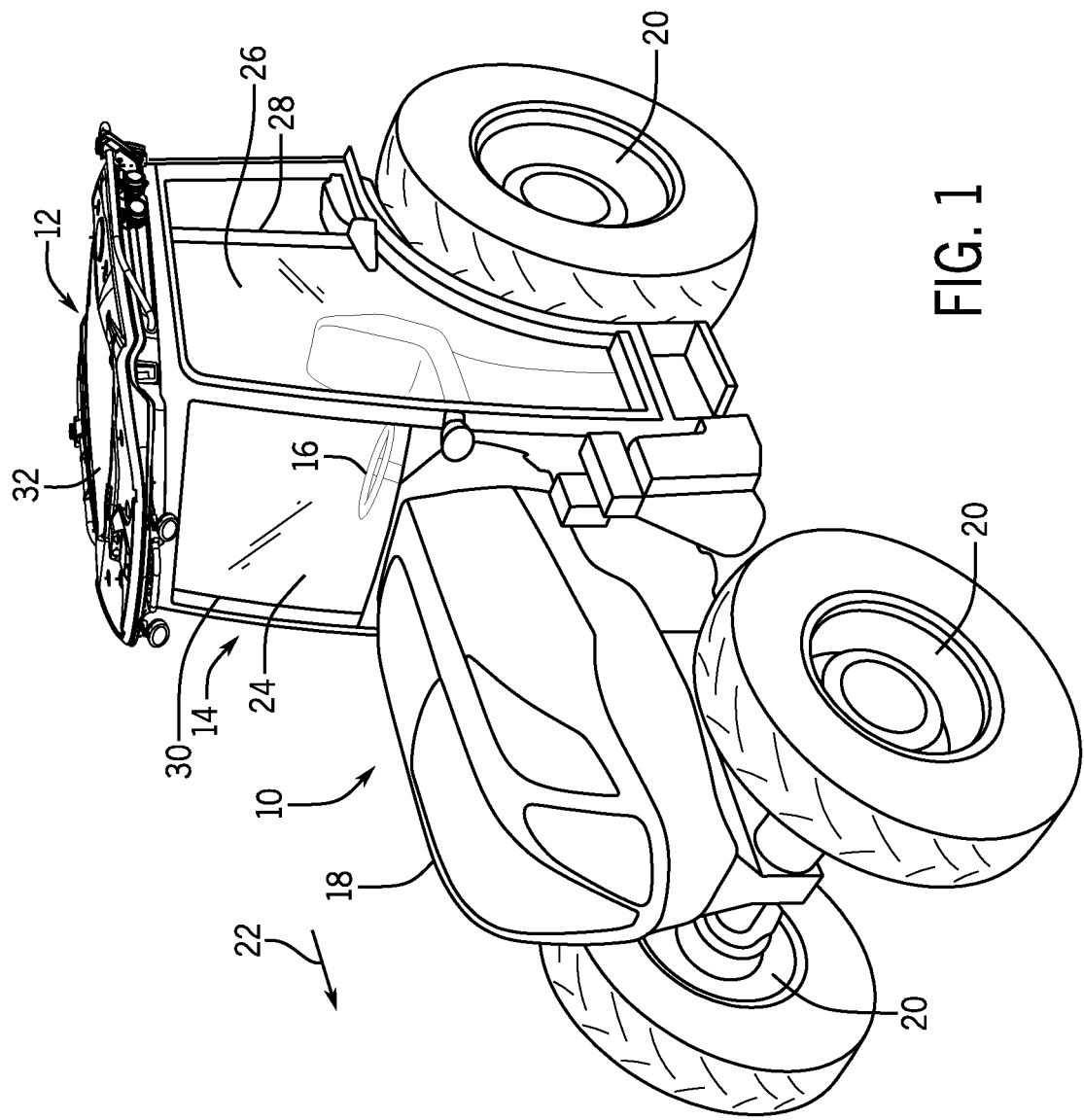
FIG. 1 is a perspective view of an embodiment of a work vehicle having an embodiment of a roof assembly.

FIG. 1 is a perspective view of an embodiment of a work vehicle 10 having an embodiment of a roof assembly 12. In the illustrated embodiment, the work vehicle 10 includes a cab 14 configured to house an operator. A steering wheel 16 is disposed within the cab 14 to facilitate control of the work vehicle 10. The cab 14 may also house additional controls to enable the operator to control various functions of the work vehicle (e.g., movement of a tool coupled to the work vehicle, speed of the work vehicle, etc.). In the illustrated embodiment, the work vehicle 10 includes a body 18 configured to house an engine, a transmission, other systems of the work vehicle 10, or a combination thereof. In addition, the work vehicle 10 includes wheels 20 configured to be driven by the engine, thereby driving the work vehicle 10 through a field and/or along a road in a direction of travel 22. While the work vehicle 10 includes wheels 20 in the illustrated embodiment, in other embodiments, the work vehicle may include tracks or a combination of wheels and tracks. Furthermore, while the work vehicle 10 is a tractor in the illustrated embodiment, in other embodiments, the work vehicle may be a harvester, a sprayer, a bulldozer, or any other suitable type of work vehicle.

In the illustrated embodiment, the cab 14 of the work vehicle 10 includes a windshield 24 and a door 26. The windshield 24 substantially blocks dirt, debris, and water from entering an interior of the cab 14. In addition, the door 26 selectively facilitates ingress and egress of the operator. In the illustrated embodiment, the door 26 is rotatably coupled to a frame of the cab 14 by a hinge 28 that enables the door 26 to rotate between the illustrated closed position and an open position. In the illustrated embodiment, the cab 14 also includes a windshield wiper 30. The windshield wiper 30 is configured to remove water from the windshield 24, thereby enhancing operator visibility.

The roof assembly 12 includes a roof panel 32 configured to shield the operator from sun and rain during operation of the work vehicle 10. In the illustrated embodiment, the roof panel includes a vertical peak positioned longitudinally between a forward end and a rearward end of the roof panel. In addition, the roof panel is sloped downwardly from the vertical peak to the forward end of the roof panel to direct water toward the forward end, and the roof panel is sloped downwardly from the vertical peak to the rearward end of the roof panel to direct water toward the rearward end. Furthermore, the roof panel includes a ridge extending around a periphery of the roof panel. The ridge is configured to control water flow from the roof panel. The ridge has a first gap positioned at the rearward end of the roof panel and configured to enable water flow through the ridge, the ridge has a second gap positioned at the forward end of the roof panel and configured to enable water flow through the ridge, and the ridge has a third gap positioned at a first lateral end of the roof panel and configured to enable water flow through the ridge. Accordingly, water may be directed through the gaps as rain flows onto the roof panel. In addition, the roof panel does not include a channel extending along the roof panel. Accordingly, the quantity of water collecting (e.g., pooling) on the roof panel may be substantially reduced, thereby substantially reducing water flow from the roof panel in response to rotation of the cab about a longitudinal axis and/or a lateral axis of the roof assembly.

Furthermore, in the illustrated embodiment, the second gap is configured to direct water to flow generally along a column/pillar of the cab 14, thereby substantially reducing interference with operator visibility. In addition, in the illustrated embodiment, the third gap is configured to be substantially aligned with the door hinge 28 along a longitudinal axis of the roof assembly to direct water toward the door hinge 28. Accordingly, the water that flows through the third gap may not flow onto the operator as the operator enters and exits the cab.

As used herein, "channel" refers to an upwardly-facing open pathway (e.g., valley) within the roof panel having a length substantially greater than a width of the channel. For example, the length may be at least two times greater than the width, at least three times greater than the width, at least four times greater than the width, or at least five times greater than the width. The channel is configured to receive rain water (e.g., and to direct the rain water to a location at the end of the channel). Because the length of each gap disclosed herein is not substantially greater than the width of the gap (e.g., the width of each gap may be significantly greater than the length of the gap), each gap disclosed herein is not a channel.

Figure 2:
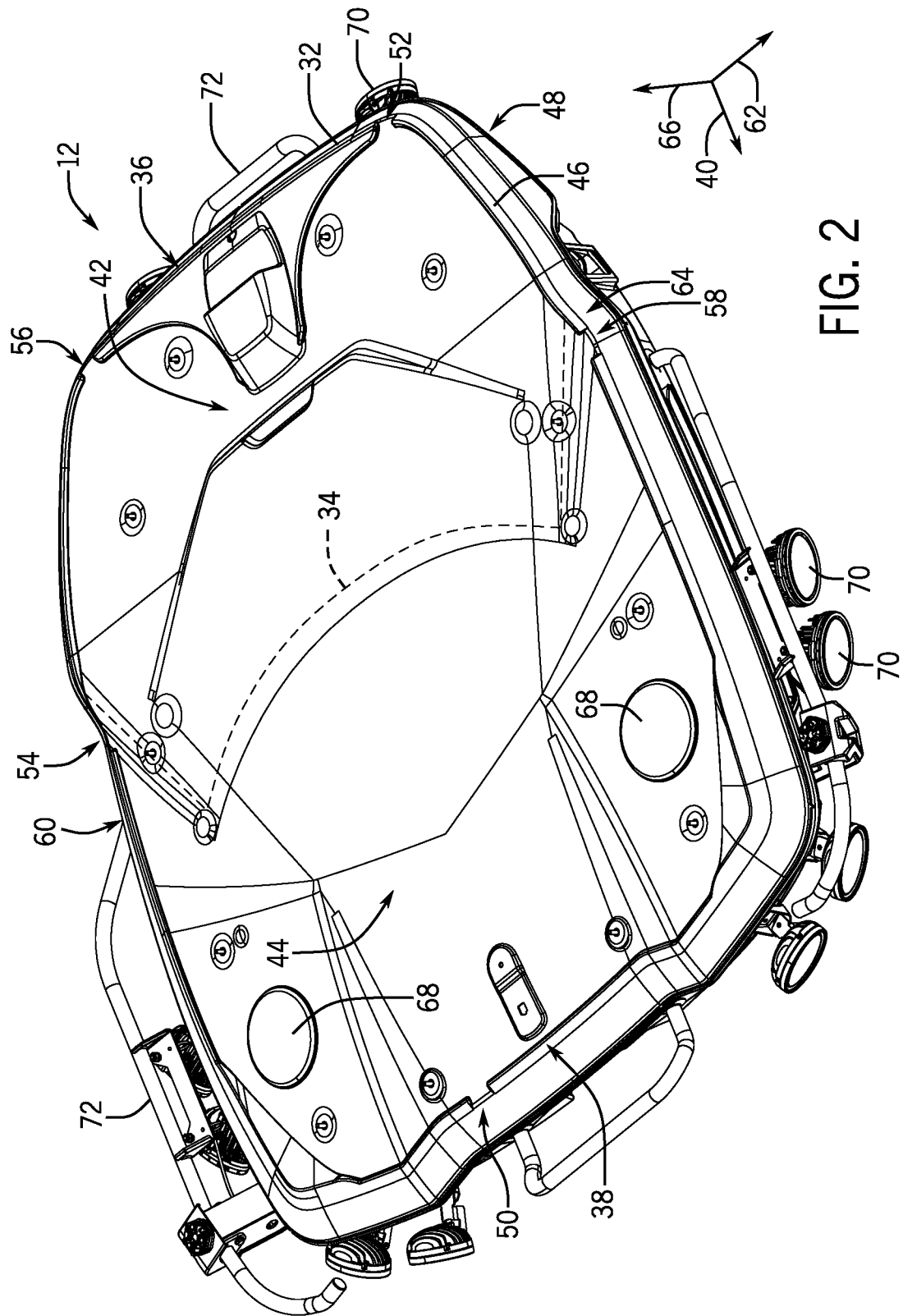
FIG. 2 is a perspective view of the roof assembly of FIG. 1.

FIG. 2 is a perspective view of the roof assembly 12 of FIG. 1. As previously discussed, the roof assembly 12 includes a roof panel 32. In the illustrated embodiment, the roof panel 32 includes a vertical peak 34 positioned longitudinally between a forward end 36 and a rearward end 38 of the roof panel 32 (e.g., positioned between the forward and rearward ends along a longitudinal axis 40). Furthermore, the roof panel 32 includes a forward surface 42 extending from the vertical peak 34 to the forward end 36 of the roof panel 32, and the roof panel 32 includes a rearward surface 44 extending from the vertical peak 34 to the rearward end 38 of the roof panel 32. The forward surface 42 slopes downwardly from the vertical peak 34 to the forward end 36 and is configured to direct water toward the forward end 36, and the rearward surface 44 slopes downwardly from the vertical peak 34 to the rearward end 38 and is configured to direct water toward the rearward end 38.

In addition, the roof panel 32 includes a ridge 46 extending about a periphery 48 of the roof panel 32. The ridge 46 is configured to control water flow from the roof panel 32. In the illustrated embodiment, the ridge 46 has a first gap 50, a second gap 52, a third gap 54, a fourth gap 56, and a fifth gap 58. The first gap 50 is positioned at the rearward end 38 of the roof panel 32 and configured to enable water flow through the ridge 46. In addition, the second gap 52 and the fourth gap 56 are positioned at the forward end 36 of the roof panel 32 and are configured to enable water flow through the ridge 46. Furthermore, the third gap 54 is positioned at a first lateral end 60 of the roof panel 32 (e.g., first end of the roof panel 32 along a lateral axis 62) and configured to enable water flow through the ridge 46. In addition, the fifth gap 58 is positioned at a second lateral end 64 of the roof panel 32 and configured to enable water flow through the ridge 46. Accordingly, the ridge 46 is configured to control water flow from the roof panel 32 by substantially blocking water flow across the ridge 46 except at the gaps and enabling water flow through the ridge 46 at the gaps.

Each gap is positioned to direct water flow from the roof panel 32 to a desired location (e.g., such that the water flows from the roof panel 32 along a vertical axis 66 toward a desired area/region of the work vehicle). For example, the first gap 50 may be configured to be substantially aligned with a windshield wiper along the lateral axis 62 of the roof assembly 12 to direct water toward the windshield wiper. Accordingly, the water that flows through the first gap 50 may be substantially removed from the windshield via the windshield wiper, thereby substantially reducing interference with operator visibility while the operator is facing rearwardly. Furthermore, the second gap 52 and the fourth gap 56 are positioned to direct water along respective columns/pillars of the cab, thereby substantially reducing interference with operator visibility. For example, in certain embodiments, the work vehicle may include a swiveling chair that enables the operator to selectively face forwardly and rearwardly. In addition, the third gap 54 is configured to be substantially aligned with a door hinge along the longitudinal axis 40 of the roof assembly 12 to direct water toward the door hinge. Accordingly, the water that flows through the third gap 54 may not flow onto the operator as the operator enters and exits the cab. In certain embodiments, the fifth gap 58 may be configured to be substantially aligned with a hinge of another door (e.g., which is configured to facilitate ingress and egress of the operator from an opposite lateral side of the cab from the door disclosed above) along the longitudinal axis 40 of the roof assembly 12 to direct water toward the respective door hinge. Accordingly, the water that flows through the fifth gap 58 may not flow onto the operator as the operator enters and exits the cab.

While the ridge 46 has five gaps in the illustrated embodiment, in other embodiments, the ridge may have more or fewer gaps. In certain embodiments, the ridge may have 1, 2, 3, 4, 6, 7, 8, 9, 10, or more gaps. For example, while the ridge 46 has one gap 50 positioned at the rearward end 38 of the roof panel 32 in the illustrated embodiment, in other embodiments, the ridge may have additional gap(s) positioned at the rearward end of the roof panel (e.g., 1, 2, 3, 4, 5, 6, or more additional gaps). Furthermore, while the ridge 46 has two gaps at the forward end 36 of the roof panel 32 in the illustrated embodiment, in other embodiments, the ridge may have more or fewer gaps positioned at the forward end of the roof panel (e.g., 1, 3, 4, 5, 6, or more). In addition, while the ridge 46 has one gap 54 positioned at the first lateral end 60 of the roof panel 32 in the illustrated embodiment, in other embodiments, the ridge may have additional gap(s) positioned at the first lateral end of the roof panel (e.g., 1, 2, 3, 4, 5, 6, or more additional gaps). Furthermore, while the ridge 46 has one gap 58 positioned at the second lateral end 64 of the roof panel 32 in the illustrated embodiment, in other embodiments, the ridge may have more or fewer gaps positioned at the second lateral end of the roof panel (e.g., 0, 2, 3, 4, 5, 6, or more). For example, in certain embodiments, the ridge may not include any gaps positioned at the second lateral end of the roof panel. While the first lateral end of the roof panel is positioned on a left side of the roof panel and the second lateral end of the roof panel is positioned on a right side of the roof panel in the illustrated embodiment, in other embodiments, the first lateral end of the roof panel may be positioned on the right side of the roof panel and the second lateral end of the roof panel may be positioned on the left side of the roof panel. For example, in embodiments in which the cab includes a single door positioned on the right side of the cab, the first lateral end of the roof panel may be positioned on the right side of the roof panel (e.g., such that the third gap is substantially aligned with the door hinge along the longitudinal axis).

As previously discussed, the roof panel 32 does not include a channel extending along the roof panel. Accordingly, the quantity of water collecting (e.g., pooling) on the roof panel may be substantially reduced, thereby substantially reducing water flow from the roof panel 32 in response to rotation of the cab about the longitudinal axis 40 and/or the lateral axis 62 of the roof assembly 12. For example, as the operator enters the cab, the weight of the operator may drive the cab to rotate toward the operator (e.g., due to the weight of the operator acting on the suspension of the cab/work vehicle). Because the roof panel does not include any channels, water flow onto the operator as the operator enters the cab may be substantially reduced. Furthermore, because the forward surface 42 extends from the vertical peak 34 to the forward end 36 of the roof panel 32 (e.g., slopes downwardly from the vertical peak to the forward end of the roof panel) and because the rearward surface 44 extends from the vertical peak 34 to the rearward end 38 of the roof panel 32 (e.g., slopes downwardly from the vertical peak to the rearward end of the roof panel), a substantial portion of the water on the roof panel 32 may be directed toward the forward end 36 and the rearward end 38. As a result, a substantial portion of the water may flow through the first gap 50, the second gap 52, and the fourth gap 56. In addition, the remainder of the water may flow through the third gap 54 and the fifth gap 58 at the lateral ends of the roof panel 32.

In the illustrated embodiment, the roof panel 32 has substantially flat surfaces 68, and each substantially flat surface 68 is configured to facilitate mounting an antenna (e.g., global positioning system antenna, radio antenna, etc.) to the roof assembly 12. In the illustrated embodiment, each substantially flat surface is circular. However, in other embodiments, at least one substantially flat surface may have another suitable shape (e.g., polygonal, elliptical, irregular, etc.). Furthermore, while each substantially flat surface is positioned proximate to a rearward lateral corner of the roof panel in the illustrated embodiment, in other embodiments, at least one substantially flat surface may be positioned at another suitable location of the roof panel. In addition, while the roof panel includes two substantially flat surfaces in the illustrated embodiment, in other embodiments, the roof panel may include more or fewer substantially flat surfaces (e.g., 0, 1, 3, 4, 5, 6, or more). For example, in certain embodiments, the roof panel may not include any substantially flat surfaces.

In the illustrated embodiment, the roof assembly 12 includes lights 70 configured to illuminate an area around the cab (e.g., while operating the work vehicle in low-light conditions). In addition, the roof assembly 12 includes grab rails 72 configured to enable an operator to access certain areas of the work vehicle. While the roof assembly includes lights and grab rails in the illustrated embodiment, in other embodiments, at least one of the lights or grab rails may be omitted.

Figure 3:
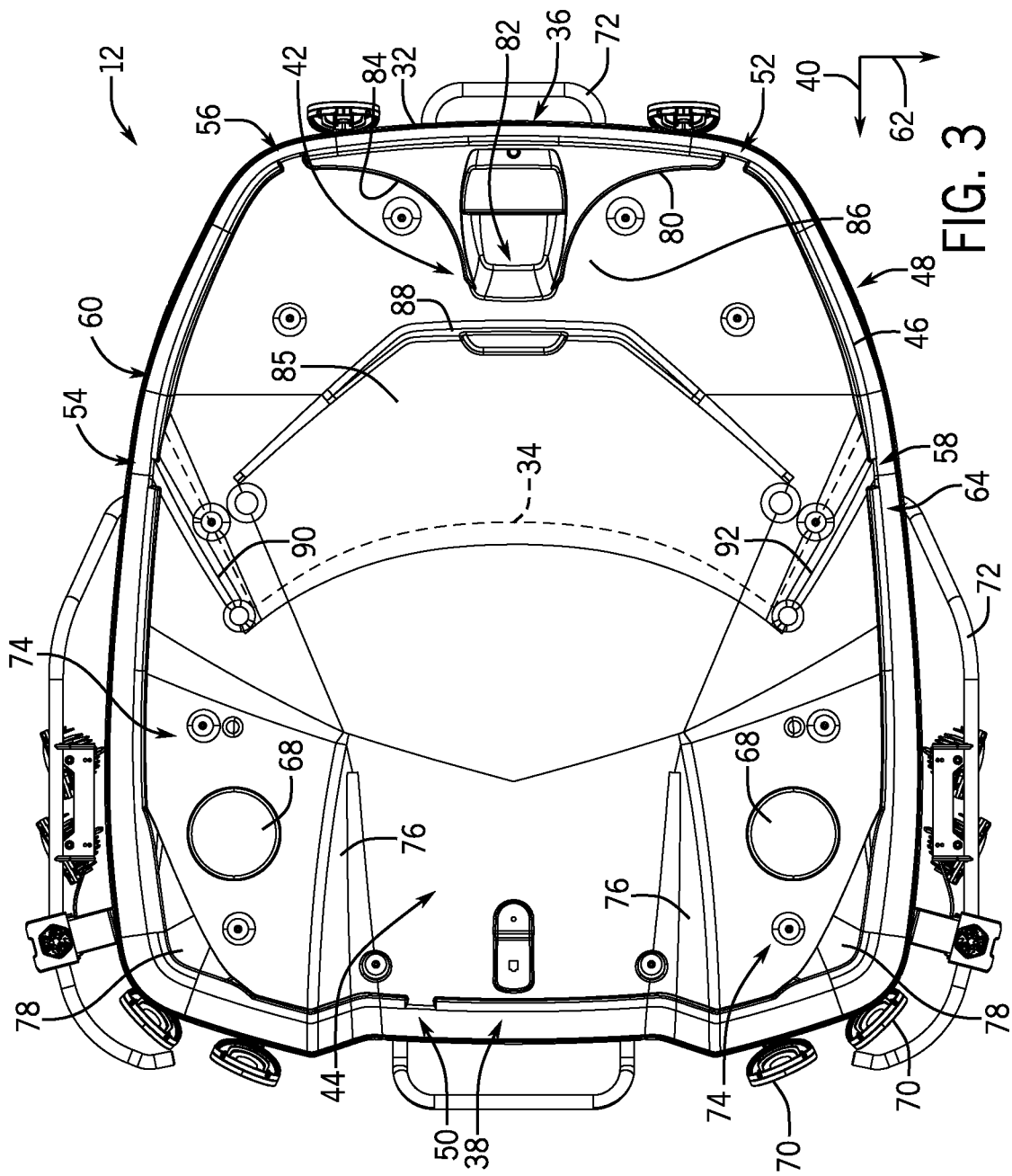
FIG. 3 is a top view of the roof assembly of FIG. 1.

FIG. 3 is a top view of the roof assembly 12 of FIG. 1. As previously discussed, the rearward surface 44 extends from the vertical peak 34 to the rearward end 38 of the roof panel 32. In addition, the rearward surface 44 slopes downwardly from the vertical peak 34 to the rearward end 38, thereby directing water toward the rearward end 38 of the roof panel 32. As a result, the water flows through the first gap 50 at the rearward end 38 of the roof panel 32. In the illustrated embodiment, the roof panel 32 includes additional surfaces 74 positioned at the rearward end 38 on opposite lateral sides of the rearward surface 44 (e.g., opposite sides of the rearward surface 44 along the lateral axis 62). The roof panel 32 also includes sloped surfaces 76, and each sloped surface 76 extends downwardly along the vertical axis from the respective additional surface 74 to the rearward surface 44. Accordingly, the sloped surfaces 76 may direct water from the respective additional surfaces 74 to the rearward surface 44, thereby enabling the water to flow through the first gap 50. While the roof panel includes two additional surfaces 74 and two sloped surfaces 76 in the illustrated embodiment, in other embodiments, at least one of the sloped surfaces and/or at least one of the additional surfaces may be omitted. For example, in certain embodiments, at least one sloped surface may be omitted, and the respective additional surface may slope downwardly to the rearward surface. Furthermore, in certain embodiments, the roof panel may not include the additional surfaces and sloped surfaces positioned at the rearward end of the roof panel.

In addition, in the illustrated embodiment, the ridge 46 includes a sloped surface 78 at the corner of the rearward end 38 and the first lateral end 60 of the roof panel 32, and the ridge 46 includes a sloped surface 78 at the corner of the rearward end 38 and the second lateral end 64 of the roof panel 32. The slope surfaces 78 are configured to direct water toward the respective additional surfaces 74. While the ridge has two sloped surfaces at the corners of the rearward end of the roof panel in the illustrated embodiment, in certain embodiments, at least one of the sloped surfaces may be omitted (e.g., both sloped surfaces may be omitted).

As previously discussed, the forward surface 42 extends from the vertical peak 34 to the forward end 36 of the roof panel 32. In addition, the forward surface 42 slopes downwardly from the vertical peak 34 to the forward end 36, thereby directing water toward the forward end 36 of the roof panel 32. As a result, the water flows through the second gap 52 and the fourth gap 56, which are positioned at the forward end 36 of the roof panel 32 and spaced apart from one another along the lateral axis 62. In the illustrated embodiment, the ridge 46 has a first curved surface 80 extending from a lateral central portion 82 of the ridge 46 to the second gap 52, and the ridge 46 has a second curved surface 84 extending from the lateral central portion 82 of the ridge 46 to the fourth gap 56. The first curved surface 80 is configured to direct water toward the second gap 52, and the second curved surface 84 is configured to direct water toward the fourth gap 56. While the ridge 46 includes the first curved surface 80 and the second curved surface 84 in the illustrated embodiment, in other embodiments, at least one of the surfaces extending from the lateral central portion of the ridge to the respective gap may have another suitable shape (e.g., straight, polygonal, etc.). Furthermore, while the ridge 46 includes two surfaces extending from the lateral central portion of the ridge to the respective gaps in the illustrated embodiment, in other embodiments, at least one of the surfaces may be omitted (e.g., the ridge may include a single surface extending from the lateral central portion of the ridge to the respective gap in embodiments in which the ridge has a single gap at the forward end of the roof panel).

Furthermore, in the illustrated embodiment, the forward surface 42 has a first portion 85 extending from the vertical peak 34, the forward surface 42 has a second portion 86 extending from the forward end 36 of the roof panel 32, and the forward surface 42 has a third portion 88 extending between the first and second portions along the longitudinal axis 40. A slope of the third portion 88 relative to a horizontal plane (e.g., a plane formed by the longitudinal axis 40 and the lateral axis 62) is greater than slopes of the first and second portions relative to the horizontal plane. The third portion 88 is configured to reduce water flow from the second portion 86 to the first portion 85, thereby facilitating water flow to the second and fourth gaps. While three portions of the forward surface 42 are disclosed above, the forward surface may have any suitable number of portions (e.g., 1, 2, 3, 4, 5, or more), in which at least one portion has a different slope relative to the horizontal plane than at least one other portion.

In the illustrated embodiment, the roof panel 32 includes a first lateral sloped surface 90 (e.g., sloped surface) and a second lateral sloped surface 92 (e.g., sloped surface). The first lateral sloped surface 90 extends to the third gap 54 positioned at the first lateral end 60 of the roof panel 32, and the second lateral sloped surface 92 extends to the fifth gap 58 positioned at the second lateral end 64 of the roof panel 32. In certain embodiments, the lateral sloped surfaces are positioned at/proximate to the vertical peak 34 (e.g., the interface between the forward surface 42 and the rearward surface 44). In the illustrated embodiment, the third gap 54 is positioned on the first lateral sloped surface 90, and the fifth gap 58 is positioned on the second lateral sloped surface 92. Each lateral sloped surface is configured to direct water toward the respective gap. While the roof panel 32 has two lateral sloped surfaces in the illustrated embodiment, in other embodiments, the roof panel may have more or fewer lateral sloped surfaces (e.g., one lateral sloped surface for each lateral gap, no lateral sloped surfaces, etc.). Furthermore, while each lateral gap is positioned on a respective lateral sloped surface in the illustrated embodiment, in other embodiments, at least one lateral gap (e.g., the third gap and/or the fifth gap) may be positioned at another suitable location at the respective lateral end of the roof panel. In such embodiments, the respective lateral sloped surface may be omitted.

Figure 4:
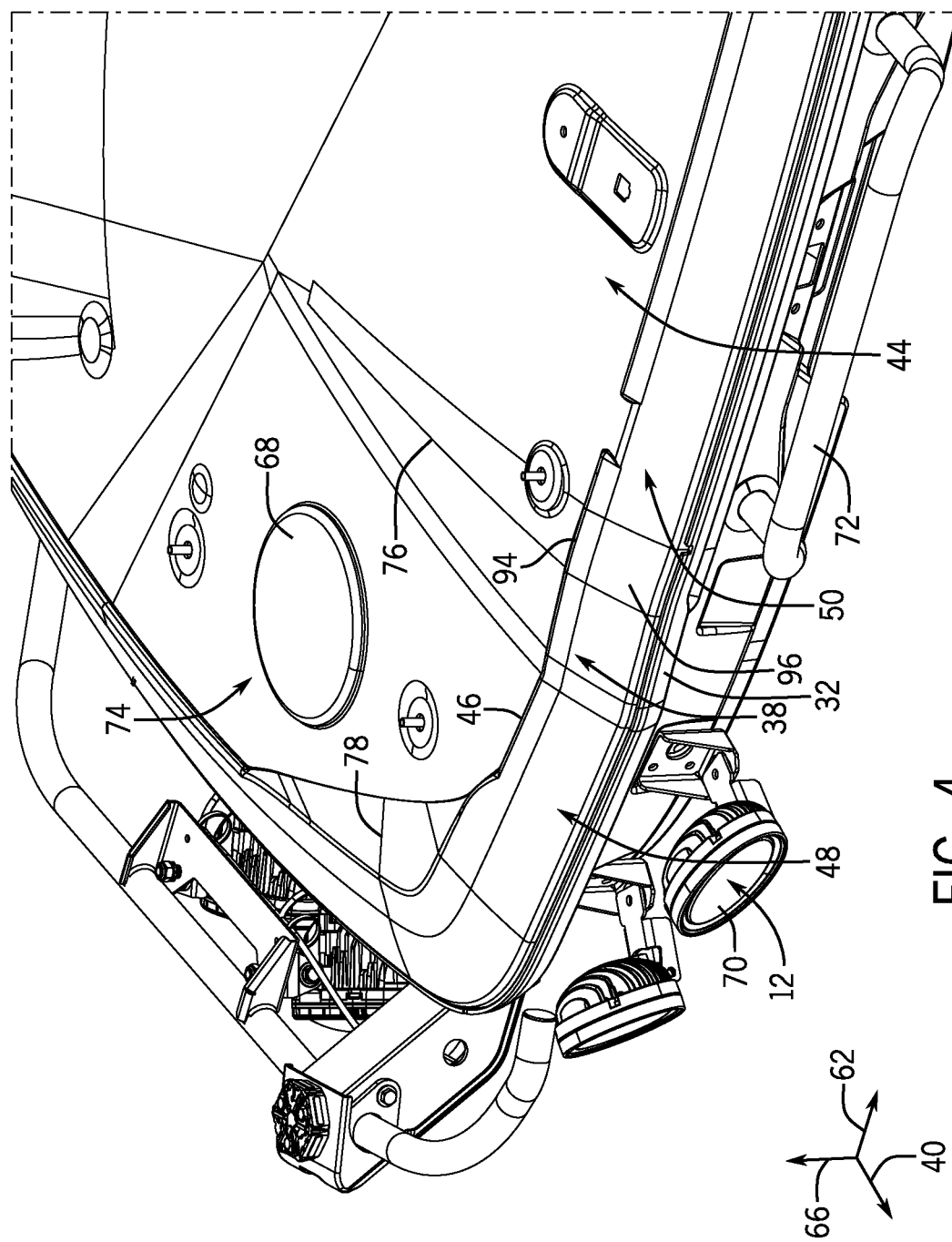
FIG. 4 is a perspective view of a portion of the roof assembly of FIG. 1.

FIG. 4 is a perspective view of a portion of the roof assembly 12 of FIG. 1. As previously discussed, the roof panel 32 includes sloped surfaces 76, and each sloped surface 76 extends downwardly along the vertical axis 66 from the respective additional surface 74 to the rearward surface 44. Accordingly, the sloped surfaces 76 may direct water from the respective additional surfaces 74 to the rearward surface 44, thereby enabling the water to flow through the first gap 50. Furthermore, as previously discussed, the ridge 46 include sloped surfaces 78 at the corners of the rearward end 38 of the roof panel 32. The sloped surfaces 78 are configured to direct the water toward the respective additional surfaces 74.

In addition, as previously discussed, the ridge 46 extends about the periphery 48 of the roof panel 32, the rearward surface 44 extends to the rearward end 38 of the roof panel 32, and the ridge 46 has the first gap 50, which is positioned at the rearward end 38 of the roof panel 32. Accordingly, the rearward end 38 of the roof panel 32 is positioned at the ridge 46, and the rearward surface 44 terminates at the ridge 46. Furthermore, the ridge 46 has an inward surface 94 configured to block water flow over the ridge 46, and the ridge 46 has an outward surface 96 configured to direct water downwardly along the vertical axis 66. In the illustrated embodiment, the inward surface 94 includes the sloped surfaces 78. Throughout the extent of the inward surface 94, the inward surface may form any suitable angle with respect to the respective surface of the roof panel (e.g., forward surface, rearward surface, additional surface, etc.).

Figure 5:
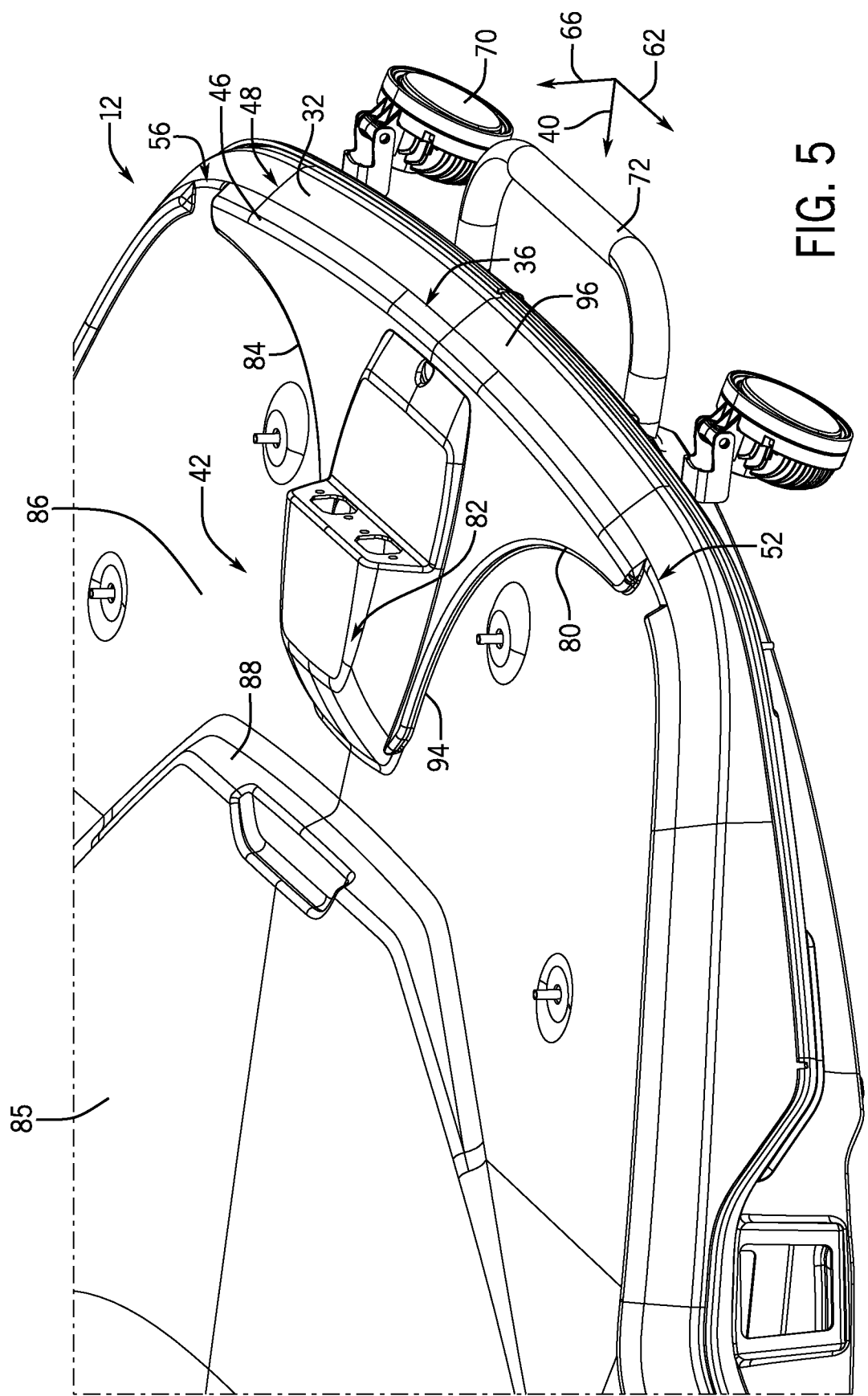
FIG. 5 is a perspective view of another portion of the roof assembly of FIG. 1.

FIG. 5 is a perspective view of another portion of the roof assembly 12 of FIG. 1. As previously discussed, the ridge 46 has a first curved surface 80 extending from the lateral central portion 82 of the ridge 46 to the second gap 52, and the ridge 46 has a second curved surface 84 extending from the lateral central portion 82 of the ridge 46 to the fourth gap 56. The first curved surface 80 is configured to direct water toward the second gap 52, and the second curved surface 84 is configured to direct water toward the fourth gap 56. While the ridge has a central portion 82 and surfaces extending from the central portion 82 to the respective gaps in the illustrated embodiment, in other embodiments, the central portion and the surfaces extending from the central portion may be omitted (e.g., such that the ridge at the forward end of the roof panel is similar to the ridge at the rearward end of the roof panel).

In addition, as previously discussed, the ridge 46 extends about the periphery 48 of the roof panel 32, the forward surface 42 extends to the forward end 36 of the roof panel 32, and the ridge 46 has the second gap 52 and the fourth gap 56, which are positioned at the forward end 36 of the roof panel 32. Accordingly, the forward end 36 of the roof panel 32 is positioned at the ridge 46, and the forward surface 42 terminates at the ridge 46. Furthermore, the inward surface 94 of the ridge 46 is configured to block water flow over the ridge 46, and the outward surface 96 of the ridge 46 is configured to direct water downwardly along the vertical axis 66. As illustrated, the inward surface 94 includes the first curved surface 80 and the second curved surface 84. Throughout the extent of the inward surface 94, the inward surface may form any suitable angle with respect to the respective surface of the roof panel (e.g., forward surface, rearward surface, additional surface, etc.).

Figure 6:
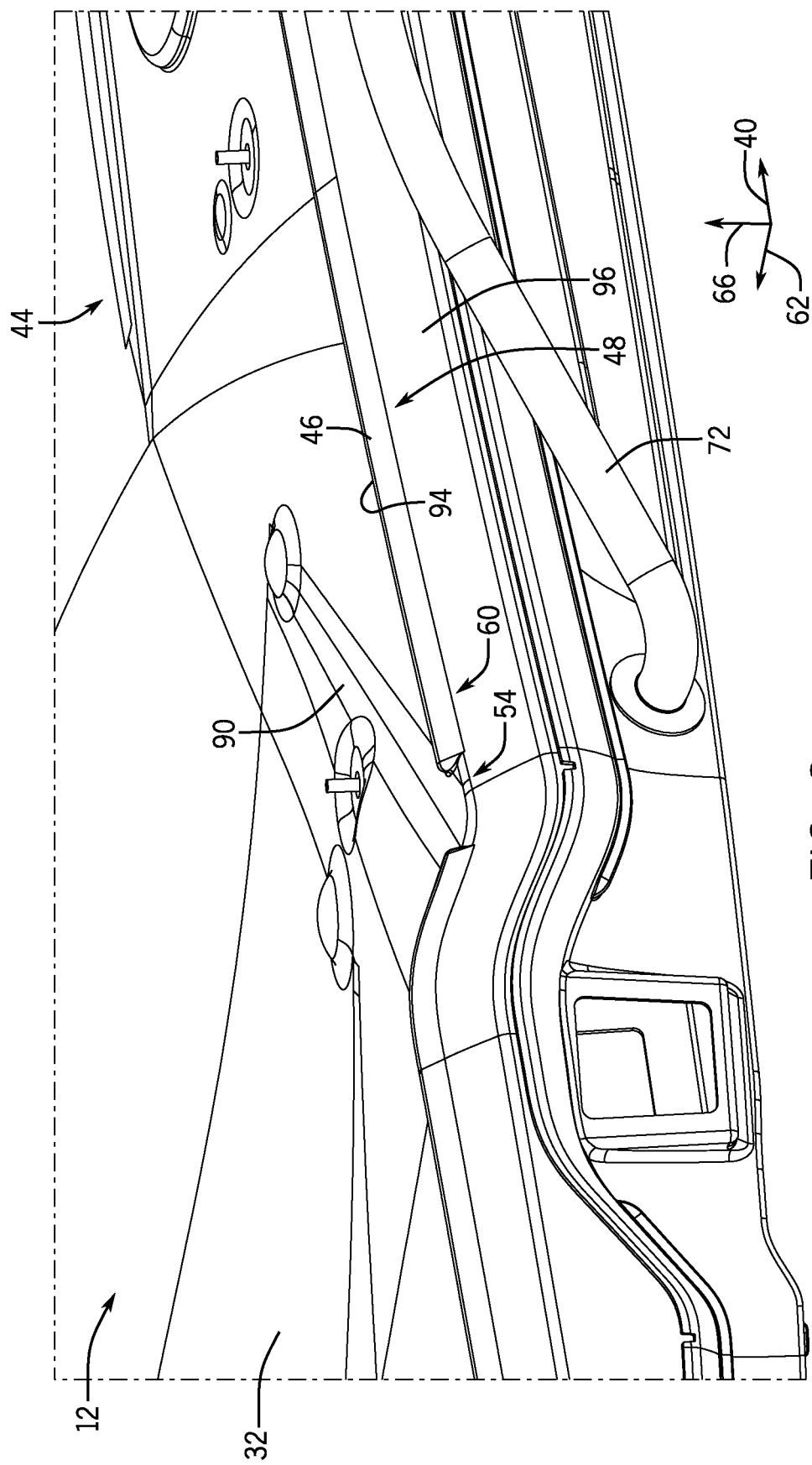
FIG. 6 is a perspective view of a further portion of the roof assembly of FIG. 1.

FIG. 6 is a perspective view of a further portion of the roof assembly 12 of FIG. 1. As previously discussed, the first lateral sloped surface 90 of the roof panel 32 extends to the third gap 54, which is positioned at the first lateral end 60 of the roof panel 32, and the first lateral sloped surface 90 is configured to direct water toward the third gap 54. In addition, the third gap 54 is positioned on the first lateral sloped surface 90. Furthermore, as previously discussed, the ridge 46 extends about the periphery 48 of the roof panel 32, and the ridge 46 has the third gap 54, which is positioned at the first lateral end 60 of the roof panel 32. In addition, the inward surface 94 of the ridge 46 is configured to block water flow over the ridge 46, and the outward surface 96 of the ridge 46 is configured to direct water downwardly along the vertical axis 66. Throughout the extent of the inward surface 94, the inward surface may form any suitable angle with respect to the respective surface of the roof panel (e.g., forward surface, rearward surface, additional surface, etc.).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A roof assembly for a work vehicle, comprising:
a roof panel comprising:
a vertical peak positioned longitudinally between a forward end and a rearward end of the roof panel;
a forward surface extending from the vertical peak to the forward end of the roof panel;
a rearward surface extending from the vertical peak to the rearward end of the roof panel; and
a ridge extending around a periphery of the roof panel, wherein the ridge has a first gap positioned at the rearward end of the roof panel, a second gap positioned at the forward end of the roof panel, and a third gap positioned at a first lateral end of the roof panel;
wherein the roof panel does not include a channel extending along the roof panel.

2. The roof assembly of claim 1, wherein the forward surface has a first portion extending from the vertical peak, the forward surface has a second portion extending from the forward end of the roof panel, the forward surface has a third portion extending between the first and second portions along a longitudinal axis of the roof assembly, and a slope of the third portion relative to a horizontal plane is greater than slopes of the first and second portions relative to the horizontal plane.

3. The roof assembly of claim 1, wherein the ridge has a fourth gap positioned at the forward end of the roof panel and spaced apart from the second gap along a lateral axis of the roof assembly.

4. The roof assembly of claim 3, wherein the ridge has a first curved surface extending from a lateral central portion of the ridge to the second gap, and the ridge has a second curved surface extending from the lateral central portion of the ridge to the fourth gap.

5. The roof assembly of claim 1, wherein the third gap is configured to be substantially aligned with a door hinge of the work vehicle along a longitudinal axis of the roof assembly.

6. The roof assembly of claim 1, wherein the ridge has a fifth gap positioned at a second lateral end of the roof panel, opposite the first lateral end.

7. The roof assembly of claim 1, wherein the third gap is positioned on a sloped surface of the roof panel.

8. The roof assembly of claim 1, wherein the roof panel has a substantially flat surface configured to facilitate mounting of an antenna.

9. A roof assembly for a work vehicle, comprising:
a roof panel comprising:
a vertical peak positioned longitudinally between a forward end and a rearward end of the roof panel;
a forward surface extending from the vertical peak to the forward end of the roof panel, wherein the forward surface is configured to direct water toward the forward end of the roof panel;
a rearward surface extending from the vertical peak to the rearward end of the roof panel, wherein the rearward surface is configured to direct water toward the rearward end of the roof panel; and
a ridge extending around a periphery of the roof panel, wherein the ridge is configured to control water flow from the roof panel, the ridge has a first gap positioned at the rearward end of the roof panel and configured to enable water flow through the ridge, the ridge has a second gap positioned at the forward end of the roof panel and configured to enable water flow through the ridge, and the ridge has a third gap positioned at a first lateral end of the roof panel and configured to enable water flow through the ridge;
wherein the roof panel does not include a channel extending along the roof panel.

10. The roof assembly of claim 9, wherein the ridge has a fourth gap positioned at the forward end of the roof panel and spaced apart from the second gap along a lateral axis of the roof assembly, and the fourth gap is configured to enable water flow through the ridge.

11. The roof assembly of claim 10, wherein the ridge has a first curved surface extending from a lateral central portion of the ridge to the second gap, the first curved surface is configured to direct water toward the second gap, the ridge has a second curved surface extending from the lateral central portion of the ridge to the fourth gap, and the second curved surface is configured to direct water toward the fourth gap.

12. The roof assembly of claim 9, wherein the third gap is positioned on a sloped surface of the roof panel.

13. The roof assembly of claim 9, wherein the ridge has a fifth gap positioned at a second lateral end of the roof panel, opposite the first lateral end, and the fifth gap is configured to enable water flow through the ridge.

14. The roof assembly of claim 9, wherein the third gap is configured to be substantially aligned with a door hinge of the work vehicle along a longitudinal axis of the roof assembly to direct water toward the door hinge.

15. The roof assembly of claim 9, wherein the roof panel has a substantially flat surface configured to facilitate mounting of an antenna.

16. A roof assembly for a work vehicle, comprising:
a roof panel comprising:
a vertical peak positioned longitudinally between a forward end and a rearward end of the roof panel, wherein the roof panel is sloped downwardly from the vertical peak to the forward end of the roof panel to direct water toward the forward end, and the roof panel is sloped downwardly from the vertical peak to the rearward end of the roof panel to direct water toward the rearward end;
a ridge extending around a periphery of the roof panel, wherein the ridge is configured to control water flow from the roof panel, the ridge has a first gap positioned at the rearward end of the roof panel and configured to enable water flow through the ridge, the ridge has a second gap positioned at the forward end of the roof panel and configured to enable water flow through the ridge, and the ridge has a third gap positioned at a first lateral end of the roof panel and configured to enable water flow through the ridge;
wherein the roof panel does not include a channel extending along the roof panel.

17. The roof assembly of claim 16, wherein the ridge has a fourth gap positioned at the forward end of the roof panel and spaced apart from the second gap along a lateral axis of the roof assembly, and the fourth gap is configured to enable water flow through the ridge.

18. The roof assembly of claim 17, wherein the ridge has a first curved surface extending from a lateral central portion of the ridge to the second gap, the first curved surface is configured to direct water toward the second gap, the ridge has a second curved surface extending from the lateral central portion of the ridge to the fourth gap, and the second curved surface is configured to direct water toward the fourth gap.

19. The roof assembly of claim 16, wherein the ridge has a fifth gap positioned at a second lateral end of the roof panel, opposite the first lateral end, and the fifth gap is configured to enable water flow through the ridge.

20. The roof assembly of claim 16, wherein the third gap is configured to be substantially aligned with a door hinge of the work vehicle along a longitudinal axis of the roof assembly to direct water toward the door hinge.

\* \* \* \* \*